April 18, 1967 V. C. BUFFERY ETAL 3,315,221

TRANSMISSION AND RECORDING OF SIGNALS IN ECHO-SOUNDING APPARATUS

Filed Jan. 22, 1965

5 Sheets-Sheet 1

INVENTORS
VICTOR CHARLES BUFFERY
HERBERT MARTIN JEFFERYS
BY
Hall, Pollock & Vande Sande
ATTORNEY INVENTORS
VICTOR CHARLES BUFFERY
HERBERT MARTIN JEFFERYS
BY
Hall, Pollock + Vande Sande
ATTORNEY INVENTORS
VICTOR CHARLES BUFFERY
HERBERT MARTIN JEFFERYS
BY
Hall, Pollock & Vande Sande
ATTORNEY INVENTORS
VICTOR CHARLES BUFFERY
HERBERT MARTIN JEFFERYS
BY
Hall, Pollock + Vande Sande
ATTORNEY INVENTORS
VICTOR CHARLES BUFFERY
HERBERT MARTIN JEFFERYS
BY
Hall, Pollock + Vande Sande
ATTORNEY United States Patent Office 3,315,221

Patented Apr. 18, 1967

3,315,221

TRANSMISSION AND RECORDING OF SIGNALS IN ECHO-SOUNDING APPARATUS

Victor Charles Buffery and Herbert Martin Jefferys, London, England, assignors to S. Smith & Sons (England) Limited, London, England, a British company Filed Jan. 22, 1965, Ser. No. 427,281
Claims priority, application Great Britain, Jan. 31, 1964, 4,350/64
12 Claims. (Cl. 340—3)

Figure 1:
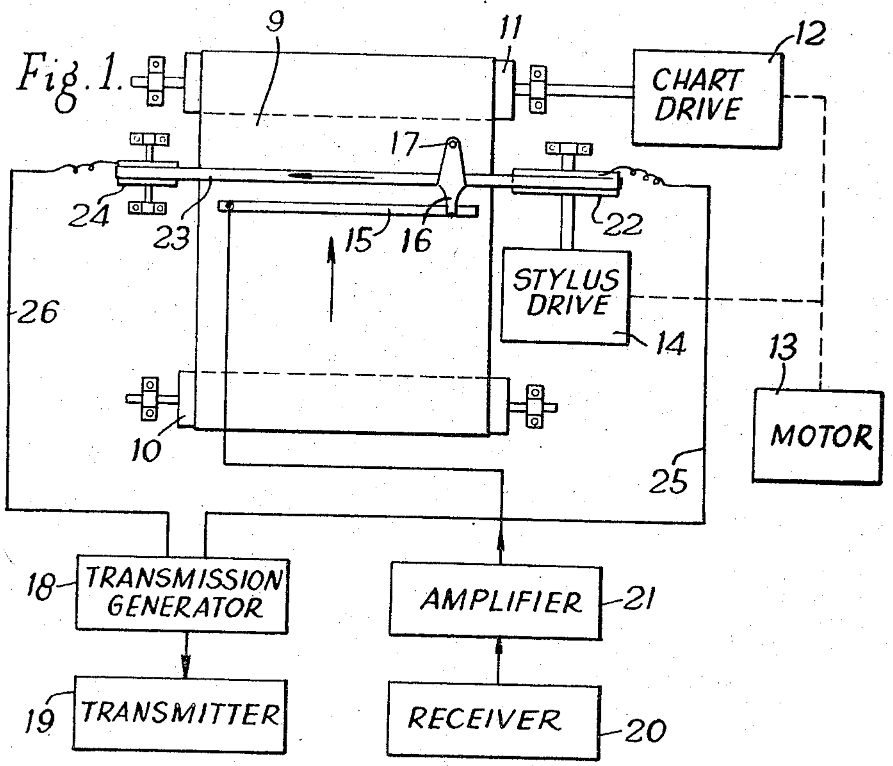

The present invention relates to echo-sounding apparatus and in particular to timing the transmission of exploring pulses from such apparatus in relation to the operation of the device used to record the echo signals. The invention is thought to be particularly applicable to apparatus for hydrographic survey and to oceanographic and navigational echo-sounders but its use in apparatus for fish detection or the detection of flaws in materials is not excluded.

When using echo-sounding apparatus for obtaining a record of the sea-bed, changes in position of the ship relative to the sea-bed can be caused by changes in the loading of the vessel and by tidal movements. The effect of such changes on the record can be compensated by adjustment of the operation of the apparatus. The adjustments required are known as draught adjustment and depth adjustment, respectively.

In accordance with the present invention, there is provided echo-sounding apparatus having a transmission generator for applying electrical pulses to a transducer to transmit pulses of mechanical wave energy and a recording element to which echo-signals representing reflected wave energy from the transmitted pulses are applied and which is carried across a recording medium by an endless belt which is in positive engagement with a wheel which executes an integral number of complete rotations for each complete circuit of the belt, in which a trigger circuit for the transmission generator includes a first switch having a normally fixed element and an element rotating with the wheel and a second switch having a normally-fixed element and an arcuate element carried by a rotary member driven at such a speed relative to that of the wheel that the closures of the switches coincide to initiate a transmission once for each recording sweep of the recording element across the recording medium, and in which, for the adjustment of the position of the recording element at which a pulse is transmitted, the fixed element of the first switch is adjustable over a range of angular positions corresponding to the range over which the fixed element of the second switch is in register with a part of the arcuate element. Preferably the belt is a toothed belt and the wheels are toothed to engage the belt. The term belt should, however, be understood as including a chain belt or any belt composed of a single length or individual elements of any suitable material.

The rotating elements of the two switches may be cams or may operate the switch photo-electrically or by electromagnetic induction, but are preferably contact elements each of which either serves to bridge a pair of fixed contacts or makes contact with a single fixed contact member and is connected to the external circuit by a slip ring.

The adjustability of the fixed element of the first switch provides for a limited adjustment of the timing of the transmitted pulse, appropriate to depth adjustment. To give a greater range of adjustment, appropriate to depth adjustment when, for example, the vessel carrying the apparatus is rising and falling with the tide in an estuary, or to alteration of the range of the apparatus, the fixed elements may be coupled for angular movement with respect to their respective rotary elements through angles proportional to the angular speeds of the wheel and the rotary member whereby the position of simultaneous closure of the switches can be progressively changed thus altering the position of the recording element at which a pulse is transmitted.

Figure 2A:
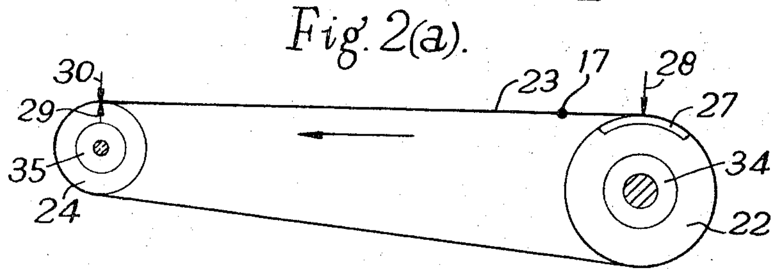
Figure 2B:
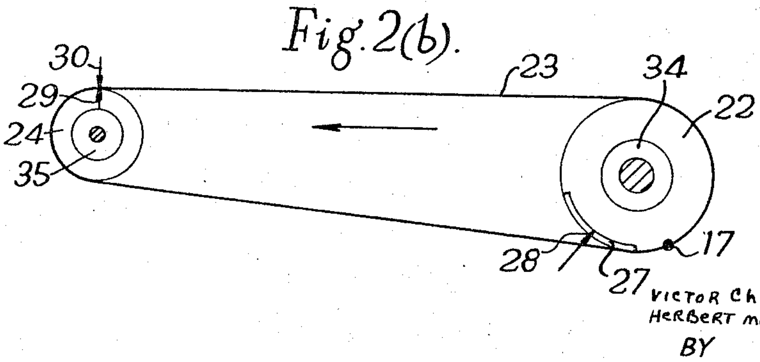
Figures 2C, 2D, 2E, 3:
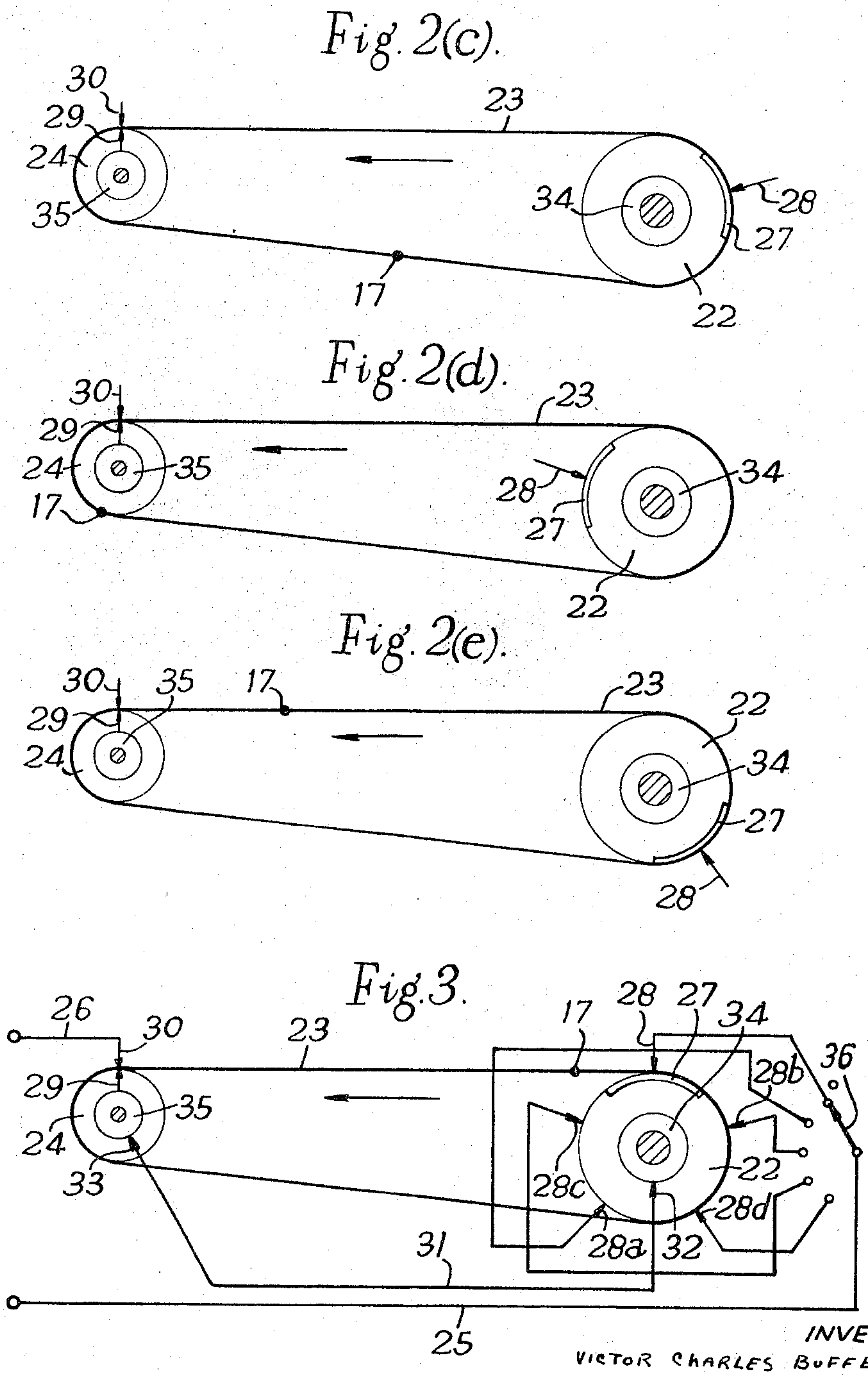
Figures 4A, 4B, 5, 6A, 6B:
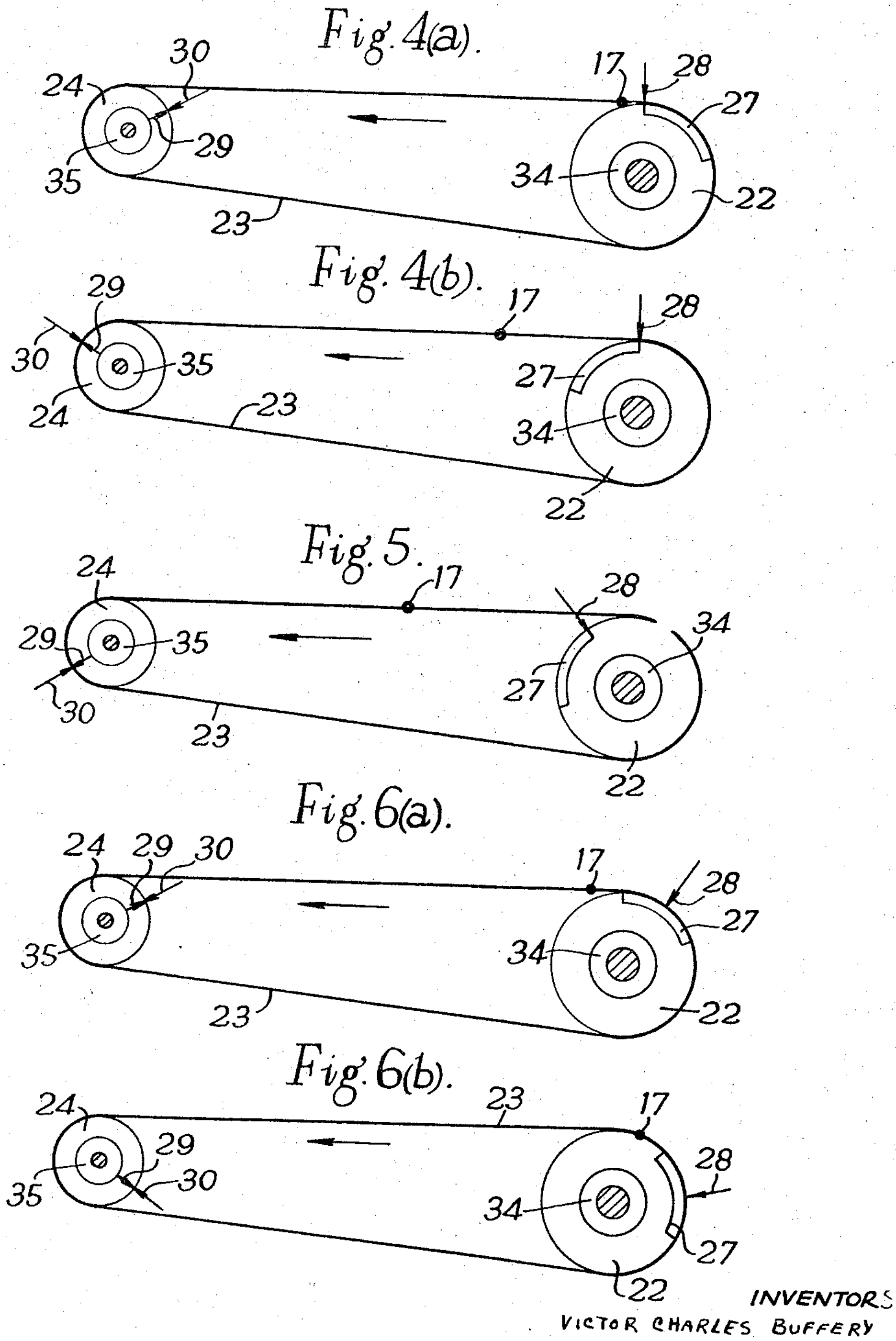
Figure 7:
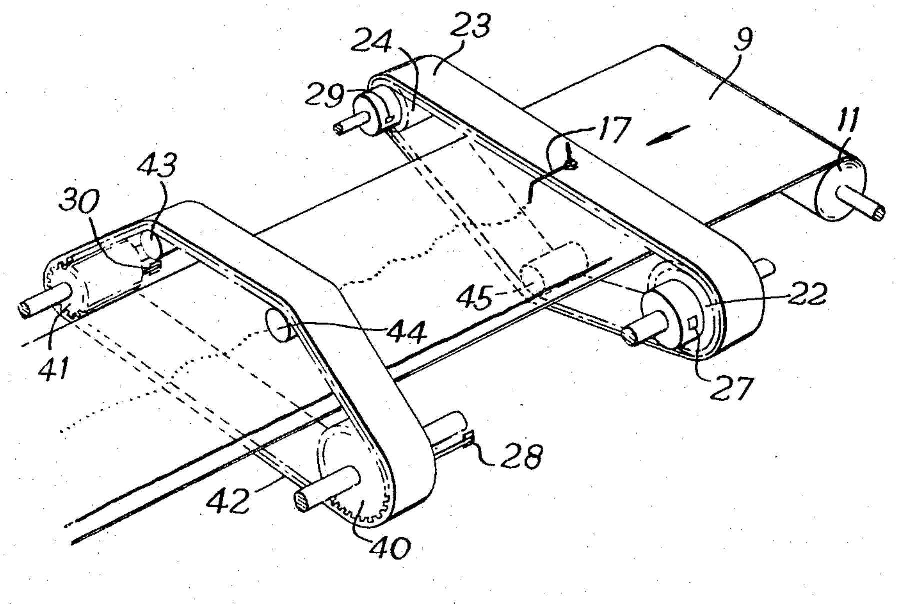

The invention will now be described in more detail with the aid of examples illustrated in the accompanying drawings in which:

FIG. 1 is a schematic diagram of echo-sounding apparatus of known type,

FIGS. 2(*a*) to 2(*e*) illustrate five different relative positions of the switches in the apparatus of FIG. 1, FIG. 3 is a schematic diagram of an alternative construction of the switches providing all the switch positions of FIGS. 2(*a*) to 2(*e*), FIGS. 4(*a*) and 4(*b*) illustrate the use, in accordance with the present invention, of an arcuate switch element on one switch and an adjustable fixed contact on the other to produce negative and positive draught adjustment, respectively, FIG. 5 illustrates the maximum positive depth adjustment obtainable with only one adjustable fixed contact, FIGS. 6(*a*) and 6(*b*) illustrate range adjustment by simultaneous movement of both fixed contacts, FIG. 7 is an exploded perspective view of apparatus operating in the manner illustrated by FIGS. 6(*a*) and 6(*b*).

Figure 8:
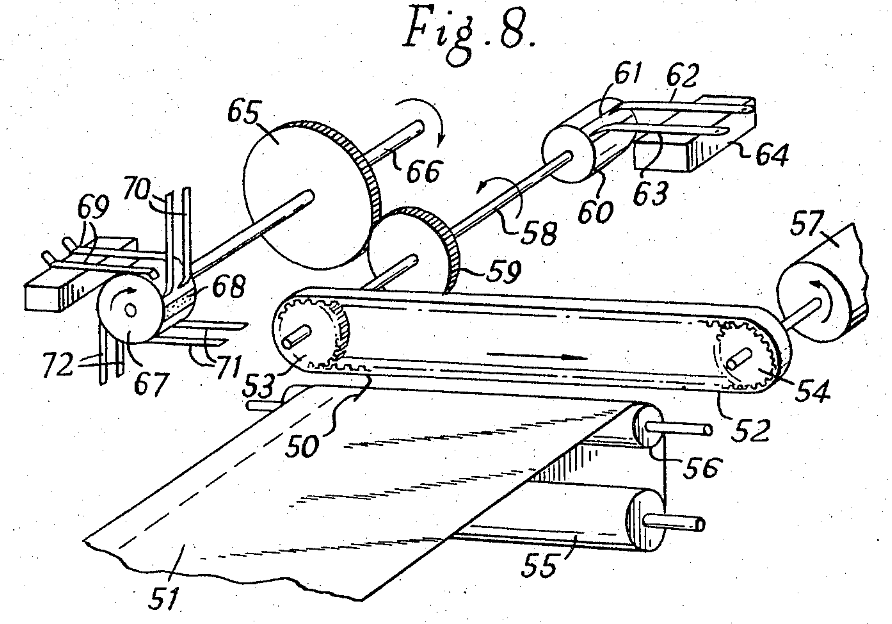
Figure 9:
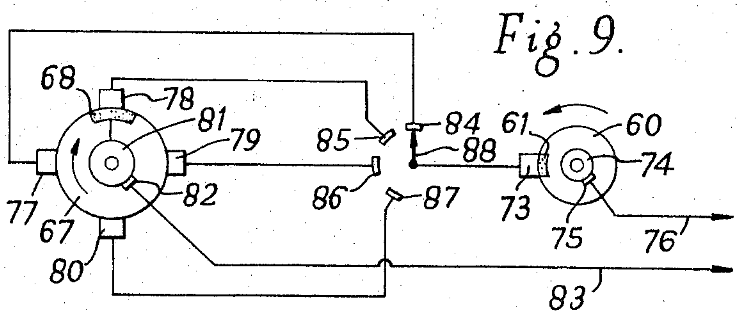

FIG. 8 is a schematic diagram of part of a further form of echo-sounding apparatus which may incorporate the invention, and FIG. 9 is a circuit diagram of a modified form of the apparatus shown in FIG. 8.

The apparatus shown in FIG. 1 has a conventional recording chart 9 which is wound from a roller 10 onto a roller 11 by a chart driving mechanism 12 driven by a motor 13. The motor 13 also drives a stylus driving mechanism 14 to move a recording stylus 17 in a straight line across the recording chart 9. The stylus 17 carries a spring arm 16 which is in contact with a platen 15 as the stylus moves across the chart 9. A transmission generator 18 periodically generates a pulse which is applied to a transmitting transducer 19 to transmit a pulse of ultrasonic wave energy into the medium to be explored. Reflected energy from the transmitted pulse is received by a receiving transducer 20 which converts it into echo-signals which are passed through an amplifier 21 and the platen 15 to the stylus 17 to be recorded by electrochemical or other known means.

The apparatus described thus far is entirely conventional and it will be appreciated that various alternatives and modifications are possible. For example, the chart may be carried by a rotating drum which may have a driving mechanism and power unit quite independent of those driving the stylus. The transmitting and receiving transducers may be replaced by a single transducer which serves alternately as a transmitter and a receiver.

The drive to the stylus 17 is transmitted by a toothed wheel 22 which engages an endless toothed belt 23 which carries the stylus. The belt 23 extends between and is supported by the toothed wheel 22 and a second toothed wheel 24. The rotation of the wheels 22 and 24 operates two switches which are connected by leads 25 and 26 to the transmission generator 18. The arrangement of these switches is shown in the subsequent figures, particularly FIG. 3.

The wheel 22 carries a moving contact 27 which co-operates with a fixed contact 28. The moving contact 27 is an arcuate element which will remain in engagement with the fixed contact 28 over a range of angles. The wheel 24 carries a moving contact 29 of small angular extend which co-operates with a fixed contact 30. The fixed contacts 28 and 30 are connected to the leads 25 and 26 respectively, and the moving contacts 27 and 29 are maintained in permanent connection by a lead 31 connecting brushes 32 and 33 which engage contact rings 34 and 35 respectively. The leads 25 and 26 and the brushes 32 and 33 with their connecting lead 31 have for clarity been omitted from FIGS. 2 and 4 to 6.

In FIG. 1 the directions of movement of the chart 9 and the belt 23 are indicated by arrows. In the remaining figures the arrow indicates the direction of movement of the belt 23 carrying the stylus 17, these elements being indicated diagrammatically.

In this embodiment the radii of the wheels 22 and 24 are in the ratio 5 to 3 and their angular speeds are therefore in the ratio 3 to 5. The belt 23 is of such a length that every point on it completes a circuit and returns to its initial position after three complete revolutions of the wheel 22. One revolution of the wheel 22 is sufficient to move the stylus 17 across the width of the chart 9.

FIG. 2(*a*) shows both the contacts 27 and 28 and the contacts 29 and 30 in engagement so that a circuit is completed to trigger the transmission generator 18 and initiate the transmission of a pulse by the transmitter 19. At this instant the stylus 17 is at the beginning of its movement across the chart and the zero of depth thus corresponds with the edge of the chart. The range of depths which can be recorded is that for which the time of travel and return of the transmitted pulse and its echo does not exceed the time of travel of the stylus across the chart. After the transmission of the pulse when the switches formed by the contact elements are both closed as shown in FIG. 2(*a*), the two switches are not again closed simultaneously until the stylus returns to the same position upon completion of a circuit by the belt. During this movement the wheel 24 rotates five times and the contacts 29 and 30 engage once in each revolution, but at the time of engagement of these contacts the contacts 27 and 28 are out of register and the circuit is thus not completed. FIGS. 2(*b*) to 2(*e*) show the position of the moving contact 27 on the wheel 22 at successively earlier times separated by the time required for one revolution of the wheel 24. It is clear from these figures that if the position of the fixed contact 28 remains the same as in FIG. 2(*a*) the contacts 27 and 28 are only in engagement simultaneously with the contacts 29 and 30 when the sylus is in the position shown in FIG. 2(*a*).

The moving of the fixed contact 28 to the positions shown in FIGS. 2(*b*) to 2(*e*) enables the transmission of a pulse to be initiated at progressively increasing times before the stylus starts its movement across the recording chart. FIG. 2(*b*), for example, shows the wheels and stylus in the position they occupy one revolution of the wheel 24 earlier than the position shown in FIG. 2(*a*). The wheel 22 has three-fifths of a revolution to complete before reaching the position shown in FIG. 2(*a*) and the stylus has a corresponding distance to travel before reaching the edge of the chart. If a pulse is transmitted at this instant by reason of the fixed contact 28 being in the position shown in FIG. 2(*b*), the maximum distance from which echoes can be recorded is increased, though the extent of the range of distances recorded, which is determined by the width of the chart, is unaltered. FIGS. 2(*c*), 2(*d*) and 2(*e*) show the positions of the fixed contact 28 which will increase the maximum distance by further equal steps.

In the alternative arrangement of FIG. 3 fixed contacts 28, **28*a*, 28*b*, 28*c* and 28*d*** are arranged at the five positions shown in FIGS. 2(*a*) to 2(*e*) and are connected to the contacts of a selector switch 36 whose moving contact is connected to the lead 25. The selector switch 36 enables any one of the five available ranges to be selected without movement of the fixed contact 28.

FIGS. 4(*a*) and 4(*b*) illustrate how the use of an arcuate contact element 27 on one wheel, which has the maximum angular extent possible without entailing the risk of simultaneous closure of the two switches more than once in every circuit of the belt carrying the stylus, enables timing adjustments to be made for the purpose of compensating for displacement of the transmitter from a datum level. Movement of the fixed contact 30 is possible between the extreme positions shown in FIGS. 4(*a*) and 4(*b*) within the range corresponding to relative movement of the fixed contact 28 from one end of the arcuate contact 27 to the other. This adjustment enables the position of the stylus upon transmission of a pulse to be adjusted over a small range of positions on either side of the position set by the range selection. For simplicity, the figures show the case of a stylus which is normally at zero of the scale when a pulse is transmited, but the possibility of adjustment about other set positions will be clearly apparent.

FIG. 5 shows a case in which the position of the fixed contact 28 has been altered so that the depth adjustment obtainable by moving the fixed contact 30 is all in one direction. When the contact 30 is in its topmost position, the two switches close simultaneously as the stylus 17 reaches the zero point at the edge of the chart. The contact 30 can be moved as far as the position shown. within the limits of engagement of the arcuate contact 27 and the fixed contact 28, to obtain triggering of the transmission at progressively later points in the travel of the stylus 17 across the chart. It will be apparent that by setting the contact 28 on the other side of the topmost position an equal degree of negative depth adjustment could be obtained.

Simultaneous adjustment of the two fixed brushes 28 and 30 enables the moment of transmission of a pulse to be continuously varied in relation to the commencement of the movement of the sylus 17 across the chart 10. By this means, relatively small depth adjustments can be made or the range can be altered at will. FIGS. 6(*a*) and 6(*b*) show the positions of the fixed brushes for successive increases in range. It will be apparent that, because of the different radii of the wheels 22 and 24 and the equal peripheral speed conditioned by the movement of the belt 23, the angular speeds of the two moving contacts 27 and 29 carried by the wheels 22 and 24 respectively, are different and the fixed contacts 28 and 30 must be rotated through angles having the same ratio as the angular speeds of the respective rotary contacts 27 and 29. This can be achieved quite simply as shown in FIG. 7 by mounting the fixed contacts 28 and 30 on toothed wheels 40 and 41, respectively, whose radii have the same ratio as the radii of the toothed wheels 22 and 24, and connecting the toothed wheels 40 and 41 by a toothed belt 42 to couple the movements of the two fixed contacts 28 and 30 in the required ratio. The toothed wheels 40 and 41 and the belt 42 may be identical in respect of the number of teeth, pitch, and circumference or length with the toothed wheels 22 and 24 and the belt 23. The position of one of the fixed brushes 28 and 30 can be adjusted manually by rotation of a control knob. The control knob may be graduated to show the range which must be added to the scale reading of the record on the recording chart 9. Alternatively, a moving scale carried or driven by the belt 42 will enable the ranges to be read directly from the chart. For example, a scale may be painted or printed on the belt 42 or may be engraved on a belt 42 which is made of transparent material, and the record on the chart can be read against this scale, which moves with the change of position of the brushes 28 and 30. For relatively small changes of range a rigid straight scale member can be used which carries a rack and is driven by gearing from the shaft of one of the wheels 40 and 41.

Gears 43 and 44 in the apparatus of FIG. 7 serve to raise the belt 42 above the recording chart 9. A gear 45 serves to maintain the belt 23 taut. Since the contacts 27 and 28 serve only to select one of the engagements of the contacts 29 and 30, the positioning of the contact 28 is not critical and if desired, gearing or other forms of coupling may be used to produce the required ratio between the movements of the fixed contacts 28 and 30.

In the apparatus of FIGS. 8 and 9, as in the apparatus of FIG. 1, a stylus 50 is carried across a recording sheet 51 by a toothed belt 52 running over toothed wheels 53 and 54. The recording sheet 51 is unrolled from a supply reel 55 and passes over an idler roller 56. The arrangements for advancing the recording sheet and applying the signal to the stylus 50 for recording are entirely conventional and may be as shown schematically in FIG. 1. The belt 52 is driven by a toothed wheel 54 which is shown schematically as being rotated by a motor 57.

The toothed wheel 53, which is rotated by its positive engagement with the toothed belt 52, is mounted on a shaft 58 which also carries a gear 59 and a contact drum 60. Once in each rotation of the wheel 53 a contact surface 61 on the drum 60 bridges two fixed contacts 62 and 63 which are shown as mounted on an insulating block 64. The gear 59 meshes with a gear 65 on a lay shaft 66 which carries a contact drum 67. The drum 67 has a contact surface 68 which bridges each of four pairs of contacts 69, 70, 71 and 72 at different points in its rotation.

The contact drum 60 with its contacts 62 and 63 forms a first switch which is connected in the trigger circuit for the transmission of pulses and is operated once for every rotation of the wheel 53. Because of the positive engagement between the wheel 53 and the belt 52, the time of operation of this first switch is precisely determined in relation to the position of the stylus 50. The contact drum 67 with its associated contacts forms a second switch which is driven by the gears 59 and 60 at such a speed relative to the first switch that the operations of the two switches only coincide once for each circuit of the belt 52.

The circuit connecting the contacts of the two switches is shown in FIG. 9. In this figure, however, the pairs of contacts shown in FIG. 8 are replaced by single fixed contacts and the contact surfaces on the drums are connected to the external circuit by slip rings. Thus the contact surface 61 on the drum 60 of the first switch co-operates with a single fixed contact 73 and is connected by a slip ring 74 and brush 75 to a lead 76. The contact surface 68 of the drum 67 of the second switch co-operates with one of four fixed contacts 77, 78, 79 and 80 and is connected by a slip ring 81 and brush 82 to a lead 83. The leads 76 and 83 correspond to the leads 25 and 26 of FIG. 1 and are connected to the transmission generator. The fixed contacts 77 to 80 are connected to terminals 84 to 87, respectively, of a selector switch whose wiper arm 88 is connected to the fixed contact 73 to complete a circuit through the two switches. According to the position of the wiper arm 88 of the selector switch a different one of the fixed contacts 77 to 80 is used and the simultaneous operation of the two switches occurs at a different time in relation to the movement of the belt 52.

It will be obvious that the plurality of fixed contacts associated with the second switch in this embodiment can be replaced by a movable contact as described in relation to other embodiments, and that, in general, features of the various embodiments described are interchangeable.

We claim:

1. In an echo-sounding apparatus, transmitting and receiving transducer means, a transmission generator connected to said transducer means for the transmission of pulses of mechaical wave energy into a medium to be investigated, a recording element electrically connected to said transducer means for the recordal of echo signals, an endless belt carrying said recording element, a recording medium, means for driving said belt to sweep the recording element repeatedly across the recording medium, a wheel in positive engagement with said belt to execute an integral number of complete rotations for each complete circuit of said belt, a rotary member, a trigger circuit coupled to said transmission generator, said trigger circuit including a first switch having a normally-fixed element and an element which rotates with said wheel, said trigger circuit also including a second switch having a normally-fixed element and an arcuate element carried by said rotary member, means for driving said rotary member at such a speed relative to that of said wheel that the closures of said switches coincide to initiate a transmission once for each recording sweep of said recording element across said recording medium, and means for adjusting the fixed element of said first switch to any selected point throughout at least a major portion of the circumference of said wheel so as thereby to adjust the phasing within each revolution of the wheel at which closure of said first switch takes place.

2. Apparatus as claimed in claim 1 in which said second switch has a set of fixed-element positions angularly spaced around said rotary member by amounts corresponding to the rotation of the rotary member occurring for each complete rotation of the wheel.

3. Apparatus as claimed in claim 2 having a plurality of fixed-switch elements located respectively at each of said fixed-element positions, and selector means for selecting one of said fixed-switch elements to determine the position of said recording element at which a pulse is transmitted.

4. Apparatus as claimed in claim 1 in which said belt is a toothed belt and said wheel is a toothed wheel in engagement with said belt.

5. Apparatus as claimed in claim 1 in which said switch elements are contact elements, the engagement of said rotary element with one of said fixed elements being operative to close the switch.

6. Apparatus as claimed in claim 1 including gearing means coupling the rotary member of said second switch to said wheel.

7. Apparatus as claimed in claim 1 having a second wheel in engagement with said belt, the rotary member of said second switch being coupled for rotation by said second wheel.

8. Echo-sounding apparatus having a recording medium, a recording element sweepable repeatedly across said recording medium to record echo-signals, means for driving said recording element across said recording medium, a transmission generator for the transmission of sounding pulses, a trigger circuit connected to said transmission generator to control said transmission of sounding pulses, said trigger circuit including a first rotary switch positively coupled to said driving means and a second rotary switch, each of said rotary switches being operative at a predetermined angular position during the rotary motion of said switch, means coupling said rotary switches to one another for rotation at such relative speeds that the said switches are operative simultaneously to initiate a transmission once for each sweep of said recording element across said recording medium, and means for simultaneously adjusting the said predetermined angular positions by amounts having the same ratio as the angular speeds of said two switches.

9. Echo-sounding apparatus as claimed in claim 8 wherein each of said switches has a normally fixed element, a rotary operating member, and a rotary element carried by said operating member and disposed for cooperation with the normally-fixed element to close the switch when the said elements are brought into register, said adjusting means comprising a mechanism coupling the normally-fixed elements of said switches to one another to move through angles proportional to the speeds of rotation of their respective rotary operating members.

10. Echo-sounding apparatus as claimed in claim 9 including a first endless belt carrying said recording element across said recording medium, said rotary operating members of said two switches being coupled to one another by said first belt, toothed wheels to which the fixed elements of said swtiches are attached, and a toothed second endless belt interconnecting said toothed wheels.

11. In an echo-sounding apparatus, transmitting and receiving transducer means, a transmission generator connected to said transducer means for the transmission of pulses of mechanical wave energy into a medium to be investigated, a recording element electrically connected to said transducer means for the recording of echo signals, an endless belt carrying said recording element, a recording medium, means for driving said belt to sweep the recording element repeatedly across the recording medium, a wheel in positive engagement with said belt to execute an integral number of complete rotations for each complete circuit of said belt, a rotary member, a trigger circuit coupled to said transmission generator, said trigger circuit including a first switch having a normally fixed element and an element which rotates with said wheel, said trigger circuit also including a second switch having a normally fixed element and an arcuate element carried by said rotary member, means for driving said rotary member at such a speed relative to that of said wheel that the closures of said switches coincide to initiate a transmission once for each recording sweep of said recording element across said recording medium, and range adjustment means for adjusting the timing relative to said recording sweep at which coincident closure of the two switches takes place, said range adjustment means including means intercoupling said normally fixed elements for angular movement together with respect to their respective rotary elements through angles proportional to the angular speeds of said wheel and said rotary member.

12. Apparatus as claimed in claim 11 including toothed wheels on which said fixed elements are mounted, and an endless toothed belt interconnecting said toothed wheels.

References Cited by the Examiner

UNITED STATES PATENTS

| | | | |
|---|---|---|---|
| 2,390,956 | 2/1943 | Hughes | 340—3 |
| 2,489,997 | 11/1949 | Anderson | 340—3 X |
| 2,610,244 | 9/1952 | Wolf | 340—3 |
| 2,925,580 | 2/1960 | Schumacher | 340—3 |
| 2,941,183 | 6/1960 | Bischof | 340—3 |
| 2,946,647 | 7/1960 | Richter | 346—74 |

RODNEY D. BENNETT, *Primary Examiner.*

CHESTER L. JUSTUS, *Examiner.*

R. A. FARLEY, *Assistant Examiner.*